United States Patent [19]
Takatsuji et al.

[11] Patent Number: 5,469,183
[45] Date of Patent: Nov. 21, 1995

[54] SYNCHRONOUS DISPLAY CONTROL APPARATUS

[75] Inventors: Ayako Takatsuji, Hirakata; Noritake Okada, Kadoma, both of Japan

[73] Assignee: Matsushita Electric Industrial Co., Ltd., Osaka, Japan

[21] Appl. No.: 77,250

[22] Filed: Jun. 14, 1993

[30] Foreign Application Priority Data

Jun. 12, 1992 [JP] Japan ..................... 4-153875

[51] Int. Cl.⁶ ..................... G09G 5/00
[52] U.S. Cl. ..................... 345/2
[58] Field of Search ............. 345/1, 2; 370/82, 370/83, 84; 340/825.14, 825.17, 825.2, 825.21

[56] References Cited

U.S. PATENT DOCUMENTS

| | | |
|---|---|---|
| 4,794,634 | 12/1988 | Torihata et al. |
| 5,103,446 | 4/1992 | Fischer ..................... 370/84 |

FOREIGN PATENT DOCUMENTS

| | | | |
|---|---|---|---|
| 54-145435 | 11/1979 | Japan ..................... | 345/1 |
| 6467061 | 3/1989 | Japan . | |
| 1067061 | 3/1989 | Japan . | |
| 1-270091 | 10/1989 | Japan ..................... | 345/2 |
| 284860 | 3/1990 | Japan . | |
| 3-29991 | 2/1991 | Japan ..................... | 345/2 |

OTHER PUBLICATIONS

Electrical Communication, vol. 60, No. 1, 1986, Brussels, BE, pp. 45–50, M. Laube, 'Audiographic Terminal'.
International Conference on Communications, vol. 2, Jun. 19, 1983, Boston, US, pp. 972–974, L. Dijkstra, 'Telewriting, History and Present Status'.

Primary Examiner—Jeffery Brier
Attorney, Agent, or Firm—Price, Gess & Ubell

[57] ABSTRACT

Disclosed is an apparatus for controlling synchronous display of data to be transmitted among a plurality of terminals interconnected over a communication line. The apparatus comprises a data segment device for, in a transmitting operation, segmenting the data into some parts at predetermined intervals; a communication device for, in a transmitting operation, transmitting the data to the receiving terminal and then receiving a reply therefrom every time a part of the data has been visible on the receiving terminal display, and for, in a receiving operation, receiving the data from the transmitting terminal and then transmitting a reply thereto every time a part of the data has been visible thereon; a display control device for, in a transmitting operation, controlling a display device to visualize the same part as is transmitted to the receiving terminal at first distinguishably from the other parts which are already visualized and then indistinguishably therefrom when the communication device receives a reply from the receiving terminal that the same part has been visible thereon, and for, in a receiving operation, controlling the display device to visualize the part of the data received from the transmitting terminal; and a reply sending device for, in a receiving operation, sending a reply to the transmitting terminal every time a part of the data transmitted from the transmitting terminal has been visible thereon.

24 Claims, 6 Drawing Sheets

TRANSMITTING TERMINAL A

TRANSMITTING TERMINAL B

TRANSMITTING TERMINAL A

MARKER ADDING / DATA SEGMENTING INTERVAL

RECEIVING TERMINAL B

MARKER ADDING / DATA SEGMENTING INTERVAL

SYNCHRONOUS DISPLAY CONTROL APPARATUS

BACKGROUND OF THE INVENTION

1. Field of the Invention

This invention relates to a synchronous display control apparatus used in an intercommunication system for interchanging image information or plotting (writing) information among a plurality of communication terminals, and to the communication terminals used therein.

2. Related Arts

Nowadays, intercommunication systems have been proposed for exchanging image data or plotting data simultaneously with conversation among communication terminals interconnected over communication lines such as ISDN, telephone networks, private lines, or the like.

One such system is disclosed in Japanese Laid-open Patent Application No. 1-067061. According to a telewriting apparatus disclosed therein, plotting data on a transmitting terminal display, which is being drawn by a sender, is transmitted to an receiver and displayed on a receiving terminal display, so that both the parties can watch the same picture while talking to each other. A data which has been outputted by the transmitting terminal but has not yet reached the receiving terminal and another data which has been already received by the receiving terminal are displayed distinguishably from each other on the transmitting terminal display, so that the parties can be freed from inconvenience caused by the disagreement about the plotting data on the display.

Another intercommunication system, which is provided with a telephone set and a display unit, is disclosed in Japanese Laid-open Patent Application No. 2-084860. According to the system, various data processing programs can be used with the telephone set among a plurality of workstations or telecommunication terminals each provided with the multi-window system, so that intercommunication conference system can be realized.

However, these constructions are on the assumption that all the communication terminals process displaying operations at the same speed, and the following points are not taken into account:

1) The difference in the display processing performance between transmitting and receiving terminals.
2) The reduction of the display processing performance by overload on the terminals.
3) The time delay caused by transmitting data.

These may cause misunderstandings between the sender and the receiver because of the disagreement between the data displayed on the transmitting terminal and on the receiving terminal.

SUMMARY OF THE INVENTION

In view of the foregoing problems, a first object of this invention is to provide a synchronous display control apparatus capable of preventing inconvenience caused by the time delay between the display of data on a transmitting terminal and the display of the same data on a receiving terminal.

A second object of this invention is to provide a transmitting terminal capable of preventing inconvenience caused by the time delay between the display of data on the transmitting terminal and the display of the same data on a receiving terminal.

A third object of this invention is to provide a training method effective for preventing inconvenience caused by the time delay between the display of data on a transmitting terminal and the display of the same data on a receiving terminal.

The first object can be achieved by an apparatus for controlling synchronous display of data to be transmitted among a plurality of terminals interconnected over a communication line. The apparatus comprises a data segmenting device for, in a transmitting operation, segmenting the data into a plurality of parts at predetermined intervals; a communication device for, in a transmitting operation, transmitting the segmented data to the receiving terminal and then receiving a reply therefrom every time a part of the segmented data has been visible on the receiving terminal display, and for, in a receiving operation, receiving the segmented data from the transmitting terminal and then transmitting a reply thereto every time a part of the segmented data has been visible thereon; a display device for visualizing the data; a display control device for, in a transmitting operation, controlling the display device to visualize the same part as is transmitted to the receiving terminal at first distinguishably from the other parts which are already visualized and then indistinguishably therefrom when the communication device receives a reply from the receiving terminal that the same part has been visible thereon, and for, in a receiving operation, controlling the display device to visualize the part of the segmented data received through the communication device from the transmitting terminal; and a reply sending device for, in a receiving operation, sending a reply to the transmitting terminal via the communication device every time a part of the segmented data transmitted from the transmitting terminal has been visible thereon.

The data segment device may be composed of a division unit for dividing the data at predetermined intervals and a marker addition unit for adding a marker between each part of the segmented data.

The data to be displayed may be data string encoded by a predetermined encoding system, and the marker is a unique bit string different from the encoded data string.

The data to be displayed may be either plotting coordinate data string inputted through a coordinate input device or image data read out by an image reader device.

The apparatus may further comprise a one-part length determination device including the following units: a training data storage unit for storing training data; a one-part display time delay detection unit for detecting the time period from when one part of the training data that is added markers at a certain length of intervals is visualized on the transmitting terminal until the transitting terminal receives the reply from the receiving terminal that the same part as visualized on the transmitting terminal has been visible on the receiving terminal; a one-part display time delay judgement unit for judging whether the detected display time delay is within a permissible range or not; an interval shortening unit for shortening the intervals to add the markers when the display time delay is detected to be out of the permissible range; and a one-part interval control unit for controlling all of the one-part display time delay detection unit, the one-part display time delay judgement unit, and the interval shortening unit so as to display training data which is added markers at different length of intervals both on the transmitting and receiving terminals, the control being continued until the display time delay detected comes to be in the permissible range.

The one-part length determination device may further comprising the following units: an entire data display time delay judgement unit for judging whether the time delay for the entire training data is within a permissible range or not after the time delay detected by the one-part display time delay judgement unit is within the permissible range; an interval expansion unit for expanding the intervals to add the markers when the time delay for the entire training data is judged to be out of the permissible range; and a feedback control unit for controlling the training to adjust the intervals for adding markers to the training data at expanded intervals to be continued until both the one-part display time delay judgement unit and the entire data display time delay judgement unit judge the intervals to be optimum.

The one-part length determination device may be driven to transmit the training data prior to the data after the connection between the transmitting and receiving terminals is established.

The data segment device may own the same information on the intervals to add markers to data as the data segment device in the other terminal, and the data segment device, in a transmitting operation, may use the information only for the data to be transmitted to the display control unit of its own terminal, while in a receiving operation, it may use the information for the data transmitted from the transmitting terminal.

The display control device may control the display device to visualize the same part as is transmitted to the receiving terminal distinguishably from the other parts which are already visible by differentiating either tones or colors between them.

The second object can be achieved by a transmitting terminal connected with a receiving terminal over a communication line in a synchronous display system for displaying data to be displayed synchronously both on the transmitting terminal and the receiving terminal. The transmitting terminal comprises: a data segment device for segmenting the data into a plurality of parts at predetermined intervals; a communication device for transmitting the segmented data to the receiving terminal and then receiving a reply therefrom every time a part of the segmented data has been visible on the receiving terminal display; a display device for visualizing the data; and a display control device for controlling the display device to visualize the same part as is transmitted to the receiving terminal at first distinguishably from the other parts which are already visualized and then indistinguishably therefrom when the communication device receives a reply from the receiving terminal that the same part has been visible thereon.

According to the above-mentioned construction, display data is segmented into a plurality of parts. The transmitting terminal controls displaying a part by receiving a reply from a receiving terminal after the part has been visible on the display of the receiving terminal. Thus, synchronous display of common data can be realized between the transmitting terminal and the receiving terminal.

The third object can be achieved by a training apparatus for setting intervals at which markers are added to data to be displayed, the apparatus being used in a synchronous display system for displaying the data synchronously both on a transmitting terminal and a receiving terminal among a plurality of terminals interconnected over a communication line. The training apparatus comprises the following units: a training data storage unit for storing training data; a one-part display time delay detection unit for detecting the time period from when one part of the training data that is added markers at a certain length of intervals is visualized on the transmitting terminal until the transitting terminal receives the reply from the receiving terminal that the same part as visualized on the transmitting terminal has been visible on the receiving terminal; a one-part display time delay judgement unit for judging whether the detected display time delay is within a permissible range or not; an interval shortening unit for shortening the intervals to add the markers when the display time delay is detected to be out of the permissible range; and a one-part interval control unit for controlling all of the one-part display time delay detection unit, the one-part display time delay judgement unit, and the interval shortening unit so as to display training data which is added markers at different length of intervals both on the transmitting and receiving terminals, the control being continued until the display time delay detected comes to be in the permissible range.

The training apparatus may further comprise the following units: an entire data display time delay judgement unit for judging whether the time delay for the entire training data is within a permissible range or not after the time delay detected by the one-part display time delay judgement unit is within the permissible range; an interval expansion unit for expanding the intervals to add the markers when the time delay for the entire training data is judged to be out of the permissible range; and a feedback control unit for controlling the training to adjust the intervals for adding markers to the training data at expanded intervals to be continued until both the one-part display time delay judgement unit and the entire data display time delay judgement unit judge the intervals to be optimum.

According to the above-mentioned construction, a marker can be added to each end of the individual part of the segmented data at the optimum intervals, thereby further enhancing synchronism of data display.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

Figure 1:
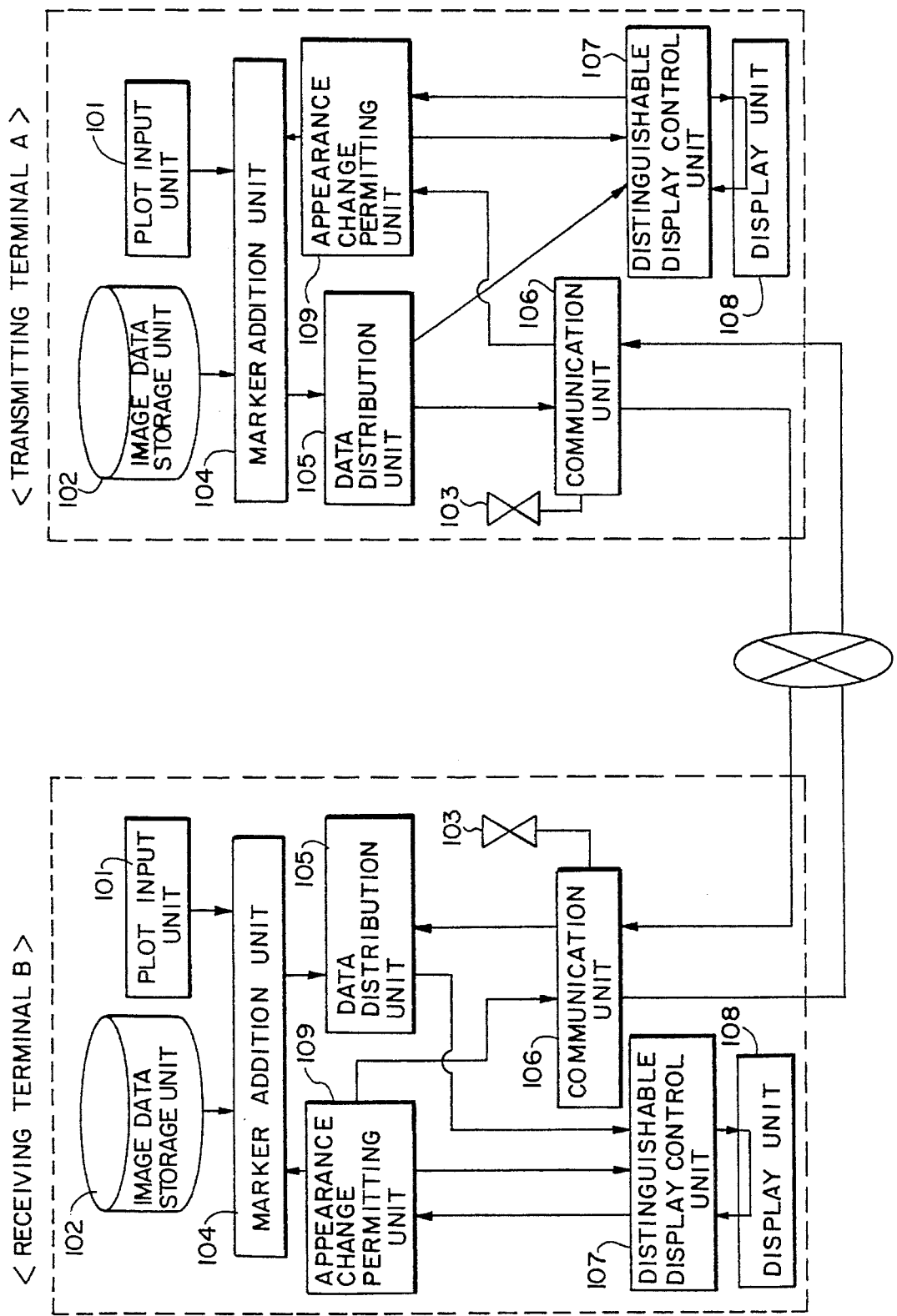
FIG. 1 shows the construction of the synchronous display control apparatus of the embodiment of this invention.

FIG. 1 shows the construction of the synchronous display control apparatus of this invention. In the figure, a transmitting terminal A and a receiving terminal B are both composed of the same units, so that the units of the transmitting terminal A only are described as follows:

A plot input unit 101 can be a key board, mouse, or electronic pen. An image data storage unit 102 stores image data such as training data or still picture for transmission. A telephone set 103 is used as a voice input/output device for users to intercommunicate via a communication unit 106. To start transmission, a marker addition unit 104 at first segments the training data into a plurality of parts, adding a marker to each end of the individual part, and then outputs the marker-added training data to a data distribution unit 105. These marker addition/marker-added training data transmission are repeated using information on marker addition intervals sent from an appearance change permitting unit 109 as a parameter until the marker addition unit 104 receives a reply from the unit 109 that the training is over. When the transmitting terminal A carries out a data transmitting operation following the completion of the training, the marker addition unit 104 adds markers at the intervals used as the parameter to data to be transmitted. The marker, which indicates a boundary between each part of the data, can be a unique bit string which does not exist or defined in sign format for data to be transmitted.

For example, when a zone encoding system defined in CCITT. 150 "telewriting terminal device" is used (each stroke drawn with an input device is encoded as consecutive vector), 16 consecutive zeros can be used as the unique bits. This is because zero vector is not usually encoded in plotting coordinate data so that more than 8 consecutive null bits never happen. Such 8 consecutive null bits only appears either when the last bit is not set on an octet boundary or when the movement of the pen is temporally stopped.

Figure 2:
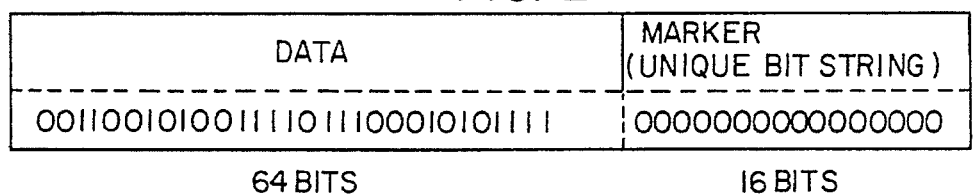
FIG. 2 shows an example of marker-added data.

FIG. 2 shows a 64-bit data added 16 consecutive zeros as the marker. The data to be transmitted can be image data as well as plotting coordinate data, and the image data may have a more than 16-bit null pattern. In that case, the marker addition unit 104 may input a "1" after 15 consecutive zeros, while the marker addition unit 104 and the appearance change permitting unit 109 both on the receiving terminal B may have a function of ignoring the bit value 1 inputted after the appearance of 15 consecutive zeros, thus avoiding confusion in distinguishing between the markers and the main data.

Figure 3:
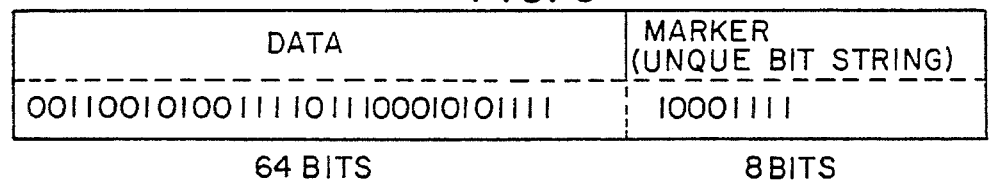
FIG. 3 shows another example of marker-added data.

FIG. 3 shows another type of marker for which an undefined bit string (10001111) is used as the operation code whose length is fixed to 8 bits. Even if variable-length plotting coordinate data incidentally has the same bit pattern as the marker, the confusion can be avoided in such a manner that the marker addition unit 104 on the transmitting terminal A outputs the bit pattern twice, while the equivalent units on the receiving terminal B ignore the second bit pattern. Image data can be coped with in the same manner as plotting coordinate data.

Figure 4:
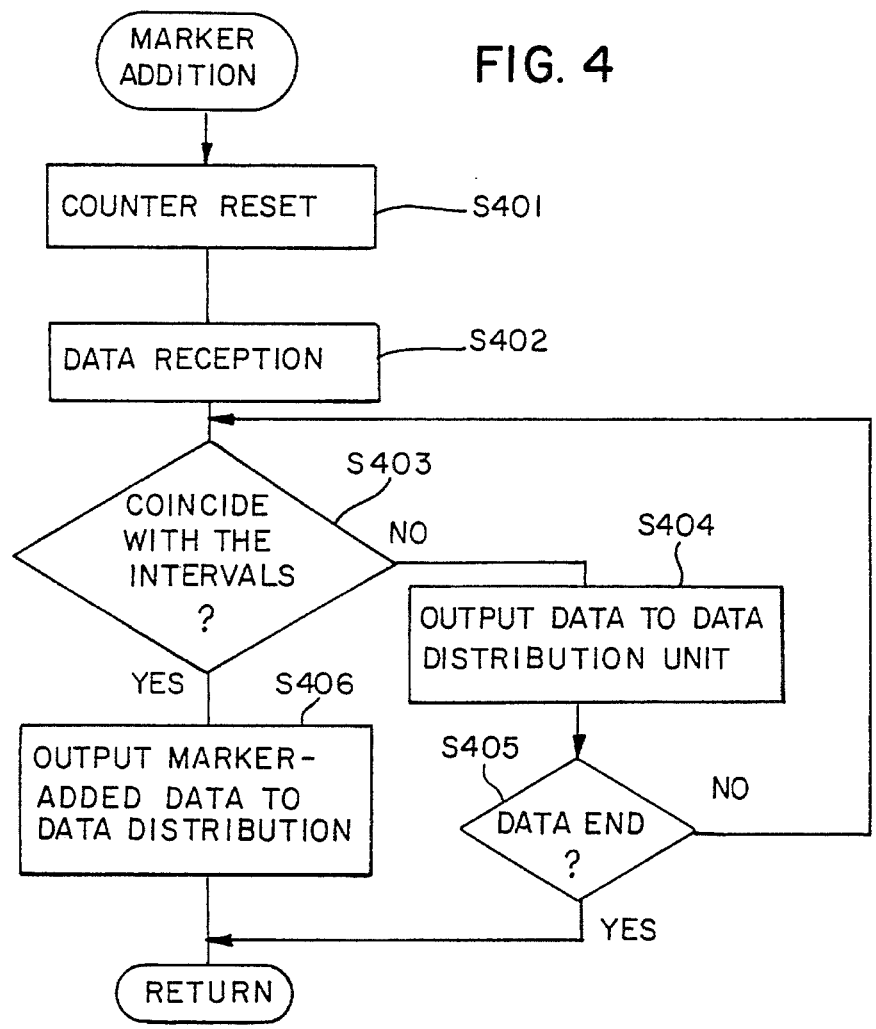
FIG. 4 is a flowchart depicting the operation for adding markers of the embodiment.

As shown in the flowchart of FIG. 4, the marker addition unit 104 operates as follows:

At first, the unit 104 resets a data counter (S401), and receives data either bit by bit or in predetermined bit groups from either the plot input unit 101 or the image data storage unit 102 (S402). Then the unit 104 counts the bit number of the data received and outputs each bit of the data to the data distribution unit 105 (S404) until the count value reaches the intervals (64 bits, for example) for adding markers (S403). When the count value comes to coincide with the intervals in the mean time, the unit 104 adds markers to the data and outputs the marker-added data to the data distribution unit 105 (S406). This process is repeated every time it is required. If the input of data to be transmitted ends before the count value reaches the intervals for adding markers (S405), then the unit 104 terminates its operation without adding a marker.

Data to be added markers by the marker addition unit 104 includes training data stored in the image data storage unit 102 besides data to be transmitted such as still picture stored in the image data storage unit 102 and plotting coordinate data inputted from the plot input unit 101.

The data distribution unit 105 outputs the marker-added data received from the marker addition unit 104 intact to both the communication unit 106 and a distinguishable display control unit 107. On the other hand, during the operation of a data reception, the same unit 105 receives marker-added data from the communication unit 106 and outputs it intact to the distinguishable display control unit 107. It is preferable that the unit 105 outputs the marker-added data to both units 106 and 107 at the same timing.

The communication unit 106 connects a plurality of communication terminals over transmission paths to form intercommunication of data/control signals and audio signals.

The distinguishable display control unit 107 makes a display unit 108 display the marker-added data received from the data distribution unit 105 in changed display appearance; for example, when the data is supposed to be displayed in black, a part of the data is displayed in gray. And every time the same part which is displayed in gray on the transmitting terminal A has become visible on the receiving terminal B, it is notified to the appearance change permitting unit 109 by the distinguishable display control unit 107. And every time the unit 107 receives a signal permitting a change of the appearance of the data on display from the unit 109, each part displayed in gray on the transmitting terminal A is sequentially returned to black. When no more gray display data is left, the distinguishable display control unit 107 notifies it to the appearance change permitting unit 109. On the other hand, during the operation of a data reception, the same unit 107 outputs marker-added data received from the data distribution unit 105 to the display unit 108, and every time one part of the segmented data becomes visible on the receiving terminal B, it is notified to the appearance change permitting unit 109 by the unit 107. The determination of a visible display on a terminal is based on the conventional enabling of the display terminal.

The appearance change permitting unit 109 waits for a reply that a part has become visible on the display unit 108 which should be sent from the distinguishable display control unit 107 and another reply that the same part as has become visible on the display unit 108 has become visible on the receiving terminal B which should be sent from the communication unit 106. When both the replys are acquired, the unit 109 outputs appearance change permitting information to the distinguishable display control unit 107. At the beginning of transmission, if this is received a reply that one part of the training data has become visible, the appearance change permitting unit 109 judges whether the difference between a time required to get the reply that a part of the segmented training data has become visible on the display unit 108 and another time required to get the other reply that the same part of the data has become visible on the receiving terminal B is within a permissible range or not. The unit 109 also judges whether a time required for transmitting/receiving the entire training data depending on the number of the markers to be added thereto is within a permissible range or not. And if both are judged to be within the ranges, then the unit 109 notifies the marker addition unit 104 that the training is over, and otherwise outputs information on adding markers at the intervals considered to be better for synchronization to the marker addition unit 104 in a manner described later. On the other hand, during the operation of a data reception, the same unit 109 outputs a reply to the communication unit 106 that a part of data has become visible on the display, which is received from the distinguishable display control unit 107.

The following equations indicate how the length of the intervals for adding markers affects the difference between a time required to visualize one part of segmented data on the transmitting terminal A and another time required to visualize the same part of the data on the receiving terminal B:

The time X required for making one part of data corresponding to the amount D visible on the transmitting terminal A is:

$$X = ta*D \quad (1)$$

wherein ta is the speed at which a displaying operation is processed in the transmitting terminal A and "*" is an operator indicating a product.

The time Y elapsed from when the transmitting terminal A starts to transmit the part for the amount D to the receiving terminal B until the terminal A receives a reply of the reception from the terminal B is:

$$Y = tb*D + S*D + F \quad (2)$$

wherein tb is the speed at which a displaying operation is processed in the receiving terminal B, S is the speed at which a transmitting operation is processed over the path between the transmitting terminal A to the receiving terminal B, and F is the time required for the receiving terminal B to transmit a reply that the part for the amount of D has become visible on the display thereof to the transmitting terminal A.

Hence, the time difference T between a time required for making the part for the amount D visible on the transmitting terminal A and another time required for making the same part visible on the receiving terminal B is:

$$T = Y - X = D(tb - ta) + S*D + F \quad (3)$$

This equation proves that the time difference T is in a linear proportion to the length of intervals for adding markers, so that the time difference T can be reduced by shortening the intervals. However, shortening the intervals increases the number of markers to be added, which undesirably increases the time required for transmitting/receiving the entire training data depending on the number of the markers to be added thereto. Hence, the best intervals for adding markers must be found considering both the time difference T and the time required for transmitting/receiving the entire training data depending on the number of the markers to be added thereto.

The following is a method for determining the best intervals for adding markers.

The appearance change permitting unit 109 waits for the reply at a part of training data has become visible on its own terminal display which is sent from the distinguishable display control unit 107 and another reply that the same part has become visible on the receiving terminal B which is sent from the communication unit 106. When both the replys are acquired, the unit 109 outputs appearance change permitting information to the distinguishable display control unit 107. Receiving a reply that one part of the training data is visible on the receiving terminal B, the unit 109 finds the difference between the time X and the time Y, or $|X-Y|$. And if the $|X-Y|$ is judged to be out of a permissible range $\delta 1$ (1 sec., for example, as designated by the users), the unit 109 outputs information on adding markers at shorter intervals to the marker addition unit 104. This output of training data is continued until the time difference is judged to be within the permissible range.

When $|X-Y| \geq \delta 1$, it is checked whether the time required for transmitting/receiving the entire training data depending on the number of the markers to be added thereto (expressed by the equation: $|X-Y| = T*$the number of markers (n)) is within the permissible range or not. Since the number of markers (n) increases according as the intervals for adding markers are shortened, $T*n$ is decreased according as the intervals are expanded and increased according as the intervals are shortened. If $T*n$ is judged to be out of an allowable time range $\delta 2$ (5 sec., for example, as the allowable time range unique to dialogue systems), that is, $T*n > \delta 2$, then information on adding markers at expanded intervals is outputted to the marker addition unit 104 to repeat training. If both $|X-Y| \leq \delta 1$ and $T*n \leq \delta 2$, then the intervals are judged to be optimum. If this cannot be obtained, that is, if $T*n \leq \delta 2$ results in $|X-Y| > \delta 1$, then the longest intervals to meet $|X-Y| \leq \delta 1$ are judged to be optimum.

Figure 5:
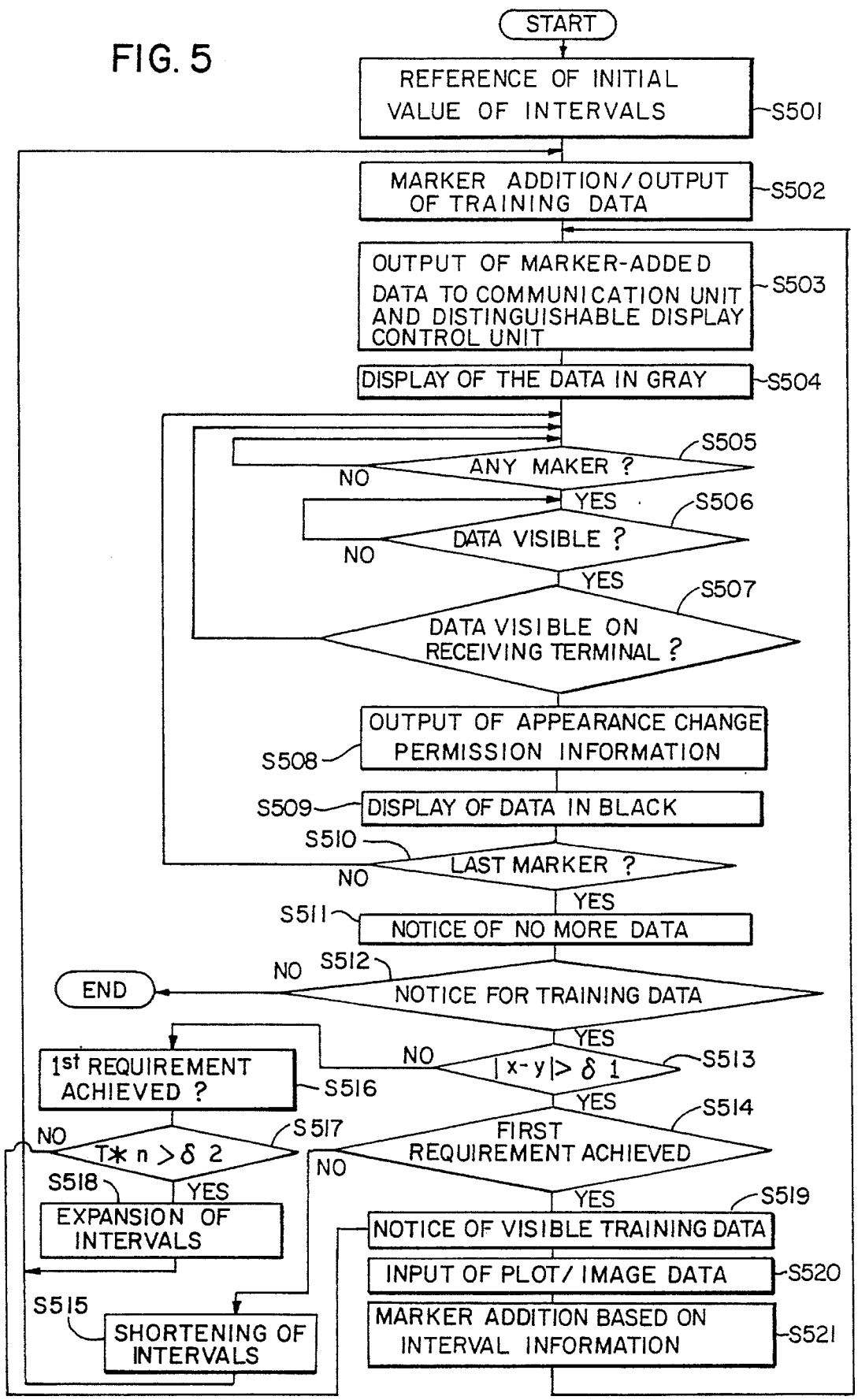
FIG. 5 is a flowchart depicting the entire operation of the transmitting terminal.
Figure 6:
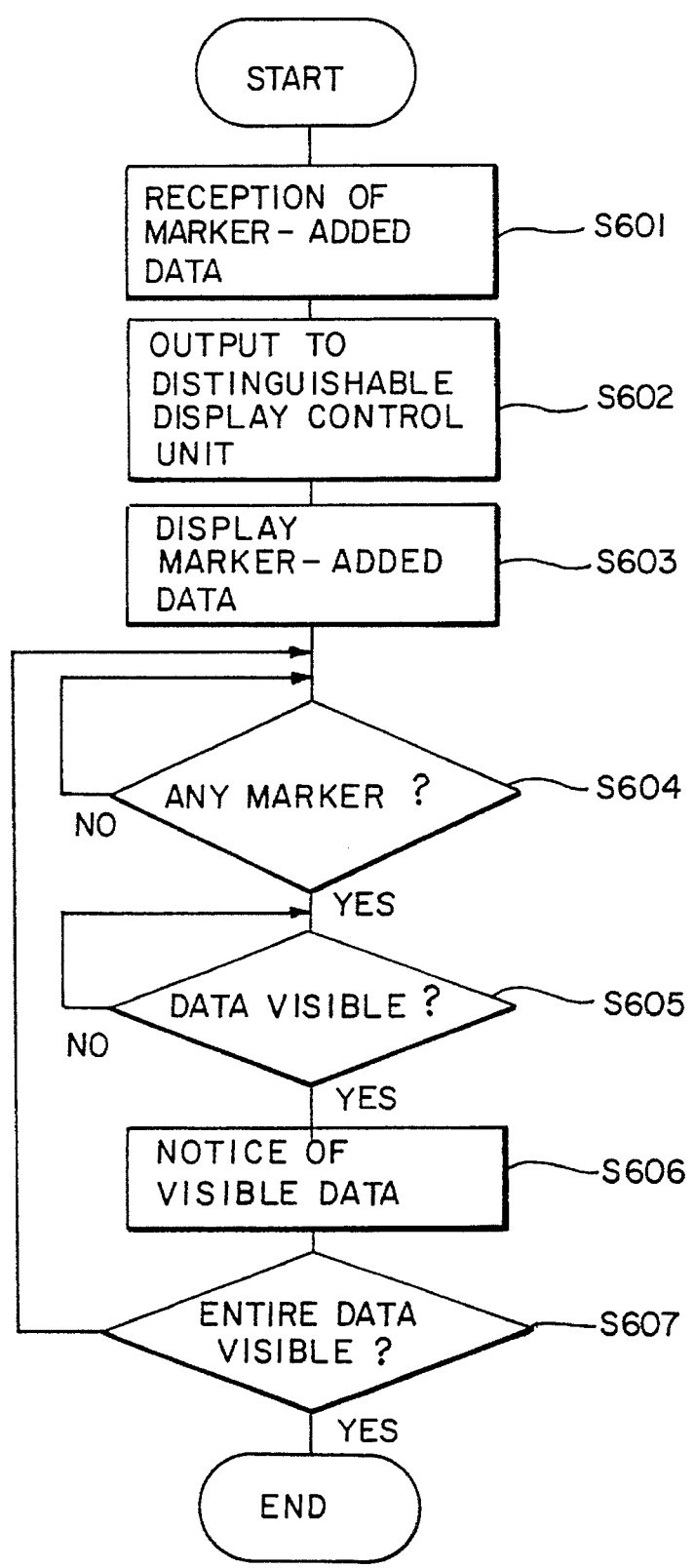
FIG. 6 is a flowchart depicting the operation of the receiving terminal.

The operation of the synchronous display control apparatus is described with reference to FIGS. 5 and 6 as follows:

As shown in the flowchart of FIG. 5, transmission of data is processed as follows:

At first, the marker addition unit 104 refers to the initial value of the intervals for adding markers pre-determined as a parameter (S501). The unit 104 then segments image data, which is held as training data in the image data storage unit 102, into a plurality of parts and adds a marker between each part at the predetermined intervals and outputs a part of the data to the data distribution unit 105 (S502). The data distribution unit 105 outputs a part with a marker to the receiving terminal B and outputs the part to the distinguishable display control unit 107 and the receiving terminal B simultaneously (S503). The distinguishable display control unit 107 causes the display unit 108 to display the marker-added part in gray (S504) and also seeks a marker (S505). If the unit 107 detects the marker, then it is judged whether the part has become visible on the display unit 108 or not. When it has, it is notified to the appearance change permitting unit 109 (S506). After this, the unit 109 waits for a reply that the part has become visible on the receiving terminal B to be sent therefrom (S507). Receiving the reply, the appearance change permitting unit 109 outputs appearance change permitting information to the distinguishable display control unit 107 (S508), and then returns the part displayed in gray to black (S509).

The above-mentioned process is carried out for the marker-added entire training data. If the marker detected is the last added, no more part displayed in gray being left (S510), then it is notified to the appearance change permitting unit 109 (S511). The unit 109 confirms the reply to be for the training data (S512), and then judges whether or not the $|X-Y|$ is within the permissible range $\delta 1$ set for the training data (S513). If $|X-Y| > \delta 1$ at S513, then it is checked whether the requirement $|X-Y| > \delta 1$ has ever been met in the previous training or not (S514). If it has not, then the appearance change permitting unit 109 outputs information on adding markers at shorter intervals to the marker addition unit 104 (S515) and resumes the operations in S502–S512 for the training data which is to add markers at the shortened intervals. This is repeated until the requirement |X−Y|>δ1 is satisfied at S513. When this requirement comes to be satisfied, the satisfaction of this first requirement is stored (S516). Then it is judged whether (|X−Y|=T)*the number of markers (n) is within the allowable time range δ2 or not (S517). If T*n<δ2, then the unit 109 outputs information on adding markers at expanded intervals to the marker addition unit 104 (S518). And the operations in S502–S518 are resumed for the training data which has added markers at the expanded intervals. This is repeated until the requirement T*n≦δ2 is satisfied at S517. After the first requirement |X−Y|≦δ1 is achieved, if the intervals is expanded to get T*n≦δ2, then |X−Y|>δ1 may be induced thereby. In that case, the intervals set at S518 in those operations between S502 and S518 which are carried out immediately before the first requirement becomes not to be satisfied is regarded as optimum (S514). Then, the unit 109 notifies the marker addition unit 104 that the training is over (S519), and receives either plotting data from the plot input unit 101 or image data out of the image data storage unit 102 (S520). The marker addition unit 104 adds markers to plotting data or image data at the intervals determined by the marker addition interval information of the unit 109 and outputs the marker-added data to the data distribution unit 105 (S521). Hereinafter, the operations in S503–S511 are repeated the same number of times as the number of markers to add to data so as to complete the transmission operation.

The operation of data reception by the synchronous display control apparatus is described with reference to FIG. 6 as follows:

At first, the communication unit 106 receives marker-added data from the transmitting terminal A (S601) and then outputs the received data to the data distribution unit 105. This unit 105 outputs the data to the distinguishable display control unit 107 (S602). This unit 107 outputs the data to the display unit 108 (S603), and simultaneously seeks the marker to judge whether a part of the data has been visible on the display unit 108 (S604–S605). After it is visualized, it is notified to the appearance change permitting unit 109. This unit 109 outputs this reply to the transmitting terminal A via the communication unit 106 (S605). Hereinafter, the operations in S604–S605 are repeated until the part added the last marker has been visible (S607).

Figure 7A:
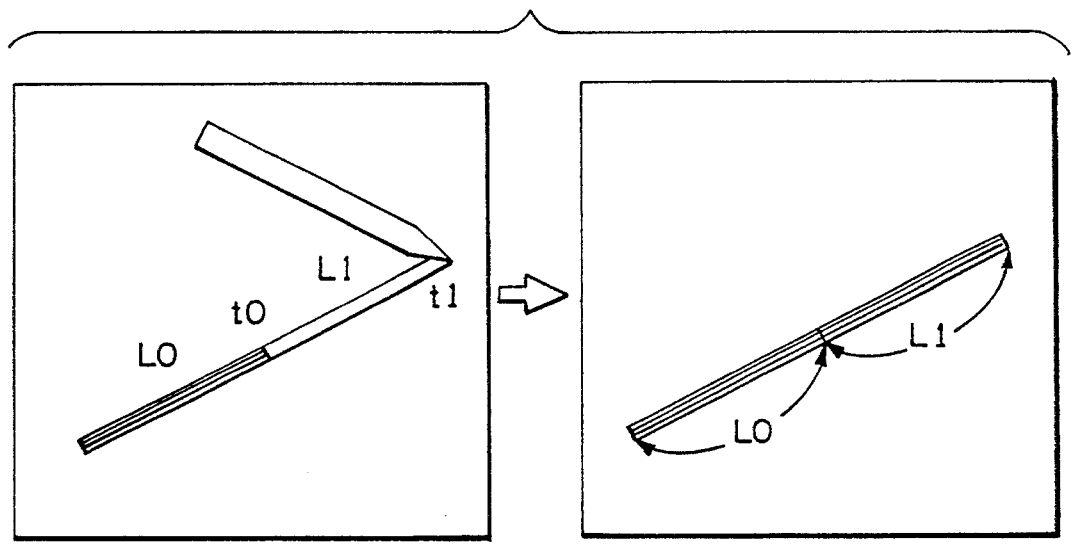
FIGS. 7A and 7B show the transition of plotting data visible on the transmitting terminal display and the receiving terminal display.

FIG. 7(a) and (b) respectively show the transition of display appearance at the transmitting terminal A and the receiving terminal B when the sender drew a straight line L. When the sender drew a portion $L_1$ between time $t_0$ and $t_1$ following a portion $L_0$, the portion $L_1$ is displayed in gray on the transmitting terminal A as shown in FIG. 7(a)(left). In contrast, the first portion $L_0$ already displayed on the receiving terminal B is displayed in black.

Figure 7B:
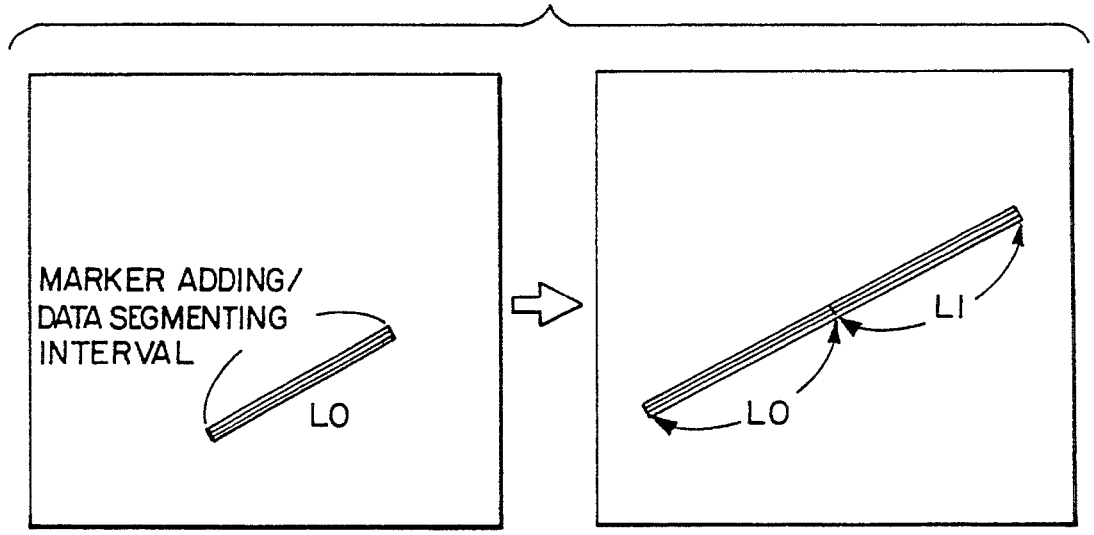

At this moment, the receiving terminal B has not received the part of the data corresponding to the portion $L_1$ yet so that only the first portion $L_0$ is visible on the receiving terminal B as shown in FIG. 7(b)(left). After the time Y in the equation (2) elapses from the time $t_0$, the part corresponding to the portion $L_1$ reaches the receiving terminal B and as a result, the portion $L_1$ is displayed in black as shown in FIG. 7(b)(right). On the other hand, as soon as the portion $L_1$ becomes visible on the receiving terminal B, it is notified to the transmitting terminal A and the portion $L_1$ is displayed in black on the transmitting terminal A as shown in FIG. 7(a)(right).

It is not simultaneous that the portion $L_1$ is changed from gray to black on the transmitting terminal A shown in FIG. 7(a) (right) and the same portion $L_1$ becomes visible on the receiving terminal B shown in FIG. 7(b)(right); the former is delayed because of the time required for the transmitting terminal A to receive a reply that the part has become visible on the receiving terminal B. However, the portion $L_1$ is displayed in gray from the start point of being drawn on the transmitting terminal A, so that the conformity of display on both terminals can be confirmed at latest when the portion $L_1$ has been changed to black as mentioned. Thus, inconvenience caused by the time delay between the display of data on a transmitting terminal A and the display of the same data on a receiving terminal B can be eliminated.

Figure 8A:
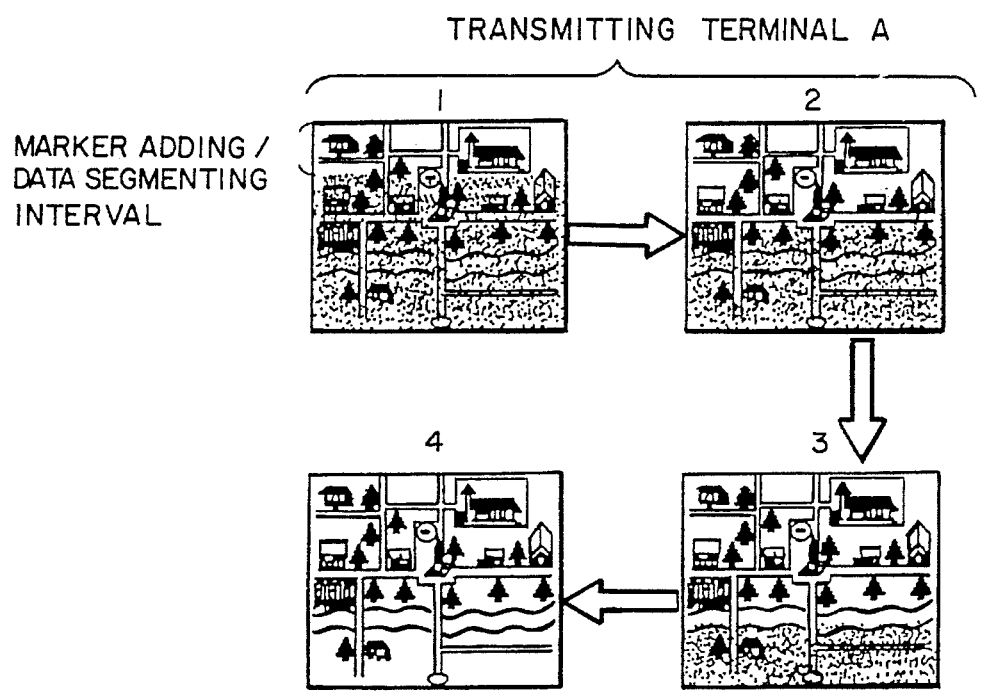
FIGS. 8A and 8B show the transition of image data visible on the transmitting terminal display and the receiving terminal display.
Figure 8B:
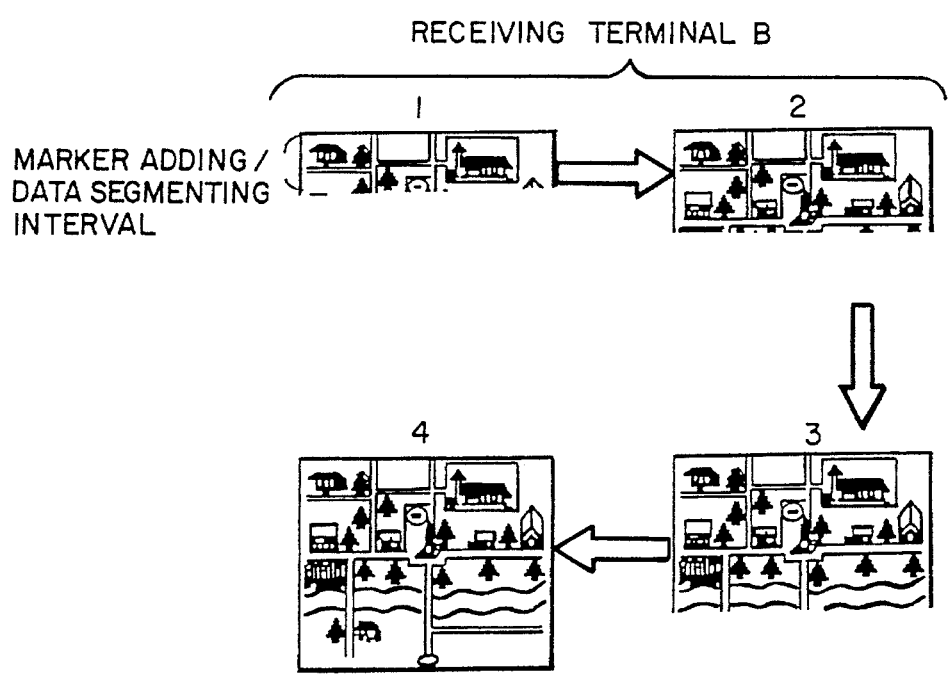

FIG. 8(a) and (b) respectively show the transition of display appearance at the transmitting terminal A and the receiving terminal B when image data is transmitted. Time proceeds from the reference numbers 1 to 4 in both (a) and (b). The comparison between (a) and (b) proves the guarantee of the conformity.

Although the data is actually sent with markers in the embodiment, information on intervals to add markers may be predetermined instead and commonly owned by both terminals. In this case, the data is segmented into parts using the information and each part is displayed in gray until the transmitting terminal A receives a reply that each part has become visible on the receiving terminal B. On the other hand, the receiving terminal B receives the data added no marker from the transmitting terminal A and segments the data using the information. And every time a part becomes visible on the receiving terminal B, it is notified to the transmitting terminal A.

Although already visualized data and not visualized data yet on the receiving terminal B are distinguished by changing their display tones on the transmitting terminal A display in the embodiment, it may be distinguished by changing intensity levels or colors.

Although the distinguishable display control unit 107 changes display tones between already visualized data and not visualized data yet on the receiving terminal B even for training data in the embodiment, the appearance for each of them does not need to be distinguished and only a reply may be received every time a part has been visible.

Although image data having very small capacity stored in the image data storage unit is used as training data in the embodiment, plot data consecutively inputted from the plot input unit 101 may be used instead.

Although a fixed interval for adding a marker to one part of the training data is used in this embodiment, each one part of training data added markers at different length of intervals may be transmitted by turns, so that it may be judged whether the first requirement is met or not for each one part and then one having the best interval among them may be selected.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A transmitting terminal connected with a receiving terminal over a communication line in a synchronous display system for displaying data to be displayed synchronously both on a transmitting terminal display and a receiving terminal display, comprising:

data segment means for segmenting the data into a plurality of parts at predetermined intervals;

communication means for transmitting the segmented data to the receiving terminal and then receiving a reply therefrom every time a part of the segmented data has been received for display on the receiving terminal display;

display means for visualizing the data; and display control means for controlling the display means to be driven to display the same part as is transmitted to the receiving terminal, at first distinguishably from the other parts which have been already transmitted for display, and then indistinguishably therefrom when the communication means receives a reply from the receiving terminal that the same part has been received for display on the display means.

2. The transmitting terminal of claim 1, wherein the data segment means is composed of a division unit for dividing the data at predetermined intervals and a marker addition unit for adding a marker between each part of the segmented data.

3. The transmitting terminal of claim 2, wherein the data to be displayed is data string encoded by a predetermined encoding system, and the marker is a unique bit string different from the encoded data string.

4. The transmitting terminal of claim 3, wherein the data to be displayed is one of plotting coordinate data string inputted through coordinate input means and image data read out by image readout means.

5. The transmitting terminal of claim 4 further comprising one-part length determination means including:

a training data storage unit for storing training data;

a one-part display time delay detection unit for detecting the time period from when one part of the training data that has added markers at a certain length of intervals is transmitted for display on the transmitting terminal until the transmitting terminal receives the reply from the receiving terminal that the same part transmitted for display on the transmitting terminal has been then received for display on the receiving terminal;

a one-part display time delay judgement unit for judging whether the detected display time delay is within a permissible range or not;

an interval shortening unit for shortening the intervals to add the markers when the display time delay is detected to be out of the permissible range; and a one-part interval control unit for controlling all of the one-part display time delay detection unit, the one-part display time delay judgement unit, and the interval shortening unit so as to display training data which has added markers at different lengths of intervals both on the transmitting and receiving terminals, the control being continued until the display time delay detected comes to be within the permissible range.

6. The transmitting terminal of claim 5, wherein the one-part length determination means further comprising:

an entire data display time delay judgement unit for judging whether the time delay for the entire training data is within a permissible range or not after the time delay detected by the one-part display time delay judgement unit is within the permissible range;

an interval expansion unit for expanding the intervals to add the markers when the time delay for the entire training data is judged to be out of the permissible range; and a feedback control unit for controlling the training to adjust the intervals for adding markers to the training data at expanded intervals to be continued until both the one-part display time delay judgement unit and the entire data display time delay judgement unit judge the intervals to be optimum.

7. The transmitting terminal of claim 6, wherein the one-part length determination means is driven to transmit the training data prior to the data after the connection between the transmitting and receiving terminals is established.

8. The transmitting terminal of claim 1, wherein the display control means controls the display means to display the same part as is transmitted to the receiving terminal distinguishably from the other parts which are already visible by differentiating one of tones and colors between them.

9. An apparatus for controlling synchronous display of data on transmitting and receiving terminal displays, the data to be transmitted among a plurality of terminals interconnected over a communication line, comprising:

data segmenting means for, in a transmitting operation, segmenting the data into a plurality of parts at predetermined intervals;

communication means for, in a transmitting operation, transmitting the segmented data to a receiving terminal and then receiving a reply therefrom every time a part of the segmented data has been transmitted for display on the receiving terminal display, and for, in a receiving operation, receiving the segmented data from a transmitting terminal and then transmitting a reply thereto every time a part of the segmented data has been completely received for display thereon;

display means for visualizing the data;

display control means for, in a transmitting operation, controlling the display means to display the same part as is transmitted to the receiving terminal, at first distinguishably from the other parts which have been already transmitted for display on the receiving terminal display, and then indistinguishably therefrom when the communication means receives a reply from the receiving terminal that the same part has been received for display thereon, and for, in a receiving operation, controlling the display means to display the part of the segmented data received through the communication means from the transmitting terminal; and reply sending means for, in a receiving operation, sending a reply to the transmitting terminal via the communication means every time a part of the segmented data transmitted from the transmitting terminal has been completely received for display thereon.

10. The apparatus of claim 9, wherein the data segment means is composed of a division unit for dividing the data at predetermined intervals and a marker addition unit for adding a marker between each part of the segmented data.

11. The apparatus of claim 10, wherein the data to be displayed is data string encoded by a predetermined encoding system, and the marker is a unique bit string different from the encoded data string.

12. The apparatus of claim 11, wherein the data to be displayed is one of plotting coordinate data string inputted through coordinate input means and image data read out by image readout means.

13. The apparatus of claim 12 further comprising one-part length determination means including:

a training data storage unit for storing training data;

a one-part display time delay detection unit for detecting the time period from when one part of the training data that has added markers at a certain length of intervals is transmitted for display on the transmitting terminal display until the transmitting terminal receives the reply from the receiving terminal that the same part as transmitted for display on the transmitting terminal has been received for display on the receiving terminal display;

a one-part display time delay judgement unit for judging whether the detected display time delay is within a permissible range or not;

an interval shortening unit for shortening the intervals to add the markers when the display time delay is detected to be out of the permissible range; and a one-part interval control unit for controlling all of the one-part display time delay detection unit, the one-part display time delay judgement unit, and the interval shortening unit so as to display training data which has added markers at different lengths of intervals both on the transmitting and receiving terminals, the control being continued until the display time delay detected comes to be in the permissible range.

14. The apparatus of claim 13, wherein the one-part length determination means further comprising:

an entire data display time delay judgement unit for judging whether the time delay for the entire training data is within a permissible range or not after the time delay detected by the one-part display time delay judgement unit is within the permissible range;

an interval expansion unit for expanding the intervals to add the markers when the time delay for the entire training data is judged to be out of the permissible range; and a feedback control unit for controlling the training to adjust the intervals for adding markers to the training data at expanded intervals to be continued until both the one-part display time delay judgement unit and the entire data display time delay judgement unit judge the intervals to be optimum.

15. The apparatus of claim 14, wherein the one-part length determination means is driven to transmit the training data prior to the data after the connection between the transmitting and receiving terminals is established.

16. The apparatus of claim 9, wherein the data segment means owns the same information on the intervals to add markers to data as the data segment means in the other terminal, and the data segment means, in a transmitting operation, uses the information only for the data to be transmitted to the display control unit of its own terminal, while in a receiving operation, it uses the information for the data transmitted from the transmitting terminal.

17. The apparatus of claim 16, wherein the data to be displayed is one of plotting coordinate data string inputted through coordinate input means and image data read out by image readout means.

18. The apparatus of claim 9, wherein the display control means controls the display means to display the same part as is transmitted to the receiving terminal distinguishably from the other parts which are already visible by differentiating one of tones and colors between them.

19. A training apparatus for setting intervals at which markers are added to data to be displayed, the apparatus being used in a synchronous display system for displaying the data synchronously both on a transmitting terminal display and a receiving terminal display among a plurality of terminals interconnected over a communication line, comprising:

a training data storage unit for storing training data;

a one-part display time delay detection unit for detecting the time period from when one part of the training data that has added markers at a certain length of intervals is transmitted for display on a transmitting terminal until the transmitting terminal receives the reply from a receiving terminal that the same part as transmitted for display on the transmitting terminal has been received for display on the receiving terminal;

a one-part display time delay judgement unit for judging whether the detected display time delay is within a permissible range or not;

an interval shortening unit for shortening the intervals to add the markers when the display time delay is detected to be out of the permissible range; and a one-part interval control unit for controlling all of the one-part display time delay detection unit, the one-part display time delay judgement unit, and the interval shortening unit so as to display training data which has added markers at different lengths of intervals both on the transmitting and receiving terminals, the control being continued until the display time delay detected is within the permissible range.

20. The apparatus of claim 19 further comprising:

an entire data display time delay judgement unit for judging whether the time delay for the entire training data is within a permissible range or not after the time delay detected by the one-part display time delay judgement unit is within the permissible range;

an interval expansion unit for expanding the intervals to add the markers when the time delay for the entire training data is judged to be out of the permissible range; and a feedback control unit for controlling the training to adjust the intervals for adding markers to the training data at expanded intervals to be continued until both the one-part display time delay judgement unit and the entire data display time delay judgement unit judge the intervals to be optimum.

21. A synchronous display system for coordinating multiple image displays at remote locations comprising:

a transmitting terminal means for generating data to be transmitted and displayed to a user, including a first display for displaying the data;

a receiving terminal means for displaying data received from the transmitting terminal, including a second display for displaying the data;

means for dividing the generated dam into sequential predetermined segments of data;

means for displaying the segments of data on the first display with a subsequent segment having a visually distinguishable characteristic to the user from an earlier displayed segment;

means for transmitting the segments of data displayed on the first display to the second display;

means for displaying the segments of data on the second display; and means for removing the visually distinguishing characteristic from the subsequent segment of displayed data on the first terminal when the subsequent segment is received by the receiving terminal means, whereby the user at the transmitting terminal means is informed that a user at the receiving terminal means is viewing the same segments of data.

22. The synchronous display system of claim 21 wherein the means for dividing the generated data includes a division unit for dividing the data at predetermined intervals and a marker addition unit for adding a marker between the predetermined segments.

23. The synchronous display system of claim 22 further including means for varying the predetermined intervals for adding markers to decrease any display time delay.

24. The synchronous display system of claim 23 further including a storage means for storing display training data and means for applying the display training data to the transmitting terminal means to enable the display system to optimize the division of data.

* * * * *